(12) United States Patent
Matsunaga

(10) Patent No.: US 8,253,575 B2
(45) Date of Patent: Aug. 28, 2012

(54) SPINDLE DEVICE

(75) Inventor: Shigeru Matsunaga, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 460 days.

(21) Appl. No.: 12/641,989

(22) Filed: Dec. 18, 2009

(65) Prior Publication Data

US 2010/0178001 A1  Jul. 15, 2010

(30) Foreign Application Priority Data

Jan. 14, 2009 (JP) ................... 2009-005792

(51) Int. Cl.
*G08B 17/00* (2006.01)
(52) U.S. Cl. ....................... 340/584; 409/135
(58) Field of Classification Search .................. 340/584; 73/593; 409/135, 231; 477/20
See application file for complete search history.

(56) References Cited

U.S. PATENT DOCUMENTS

| | | | | |
|---|---|---|---|---|
| 5,140,849 | A * | 8/1992 | Fujita et al. | 73/593 |
| 6,508,614 | B1 * | 1/2003 | Ozaki et al. | 409/231 |
| 8,096,919 | B2 * | 1/2012 | Takizawa et al. | 477/20 |
| 2009/0136167 | A1 | 5/2009 | Morita et al. | |

FOREIGN PATENT DOCUMENTS

| | | |
|---|---|---|
| EP | 2 023 104 A1 | 2/2009 |
| GB | 2 080 443 A | 2/1982 |
| JP | 2008-64183 | 3/2008 |

OTHER PUBLICATIONS

G. Spur, et al., "Überwachung des Schmierzustands fettgeschmierter Hauptspindellager", ZWF Zeitschrift für Wirtschaftliche Fertigung Undautomatisierung, vol. 87, No. 9, XP000297144, Sep. 1, 1992, pp. 492-496.

U.S. Appl. No. 13/390,654, filed Feb. 15, 2012, Matsunaga.

* cited by examiner

*Primary Examiner* — John A Tweel, Jr.
(74) *Attorney, Agent, or Firm* — Oblon, Spivak, McClelland, Maier & Neustadt, L.L.P.

(57) ABSTRACT

A spindle device is provided with a temperature sensor for detecting the temperature of an antifriction bearing or the temperature of a part of either one of a housing and a spindle which part is influenced by a temperature change of the antifriction bearing, and an abnormality detection section for detecting the abnormality of the antifriction bearing based on the change speed of the temperature of the antifriction bearing detected by the temperature sensor, so that the abnormality of the antifriction bearing can be detected more precisely.

7 Claims, 5 Drawing Sheets

Normal Operation

Abnormal Operation

Normal Operation

Abnormal Operation

Normal Operation

Abnormal Operation

_US 8,253,575 B2_

SPINDLE DEVICE

INCORPORATION BY REFERENCE

This application is based on and claims priority under 35 U.S.C. 119 with respect to Japanese Application No. 2009-005792 filed on Jan. 14, 2009, the entire content of which is incorporated herein by reference.

BACKGROUND OF THE INVENTION

1. Field of the Invention

The present invention relates to a spindle device and particularly, to a spindle device capable of detecting the abnormality of an antifriction bearing which rotatably supports a spindle.

2. Discussion of the Related Art

Heretofore, as methods of detecting the abnormality of an antifriction bearing, there has been known one which is described in, for example, JP2008-064183 A (hereafter referred to as "Japanese application"). In a method described in the Japanese application, the temperature of an antifriction bearing is detected, and when the detected temperature exceeds a threshold value, it is judged that the antifriction bearing is abnormal.

However, the temperature of such an antifriction bearing changes in dependence on the rotational speed of the spindle. Thus, in the prior art, the threshold value has been set in relation to the maximum rotational speed of the spindle. For example, spindles for machine tools have been used at various rotational speeds meeting objectives of machining. Specifically, where a spindle of a machine tool is designed to have the maximum rotational speed of 20,000 rpm (revolutions per minute), a rotational speed of, e.g., 5,000 rpm is used at a certain machining step, and another rotational speed of, e.g., 10,000 rpm is used at another machining step.

In such state of use, there is exhibited a behavior that the temperature of the antifriction bearing rises right after the rotational speed is increased and then, reaches a saturated state. That is, when the rotational speed of the antifriction bearing is increased from 0 rpm to 5,000 rpm, the temperature of the antifriction bearing rises for a short time and becomes approximately stable at a temperature corresponding to the rotational speed of 5,000 rpm. Then, when the rotational speed is increased from 5,000 rpm to 10,000 rpm, the temperature rises for a short time and becomes approximately stable at another temperature corresponding to the rotational speed of 10,000 rpm.

In the method described in the Japanese application, the temperature threshold value is a threshold value set in relation to the maximum rotational speed, and therefore, where the spindle device is used at a rotational speed which is considerably lower than the maximum rotational speed, the temperature difference between the actual temperature of the antifriction bearing and the threshold value becomes very large. Therefore, there is a possibility that when an abnormality occurs in the antifriction bearing rotating at such a considerably lower speed, the antifriction bearing is overheated to seizure before the temperature of the antifriction bearing reaches the temperature threshold value.

SUMMARY OF THE INVENTION

It is therefore a primary object of the present invention to provide an improved spindle device capable of detecting the abnormality of an antifriction bearing more precisely.

Briefly, according to the present invention, there is provided an improved spindle device which comprises a housing, a spindle carried in the housing, an antifriction bearing provided in the housing for rotatably supporting the spindle in the housing, a temperature sensor for detecting the temperature of the antifriction bearing or the temperature of a part of either one of the housing and the spindle which part is influenced by a temperature change of the antifriction bearing, and an abnormality detection section for detecting the abnormality of the antifriction bearing based on a change speed of the temperature detected by the temperature sensor.

With this construction, the abnormality of the antifriction bearing is detected based not on the temperature itself of the antifriction bearing, but on the change speed of the temperature of the antifriction bearing, that is, the first time-derivative value of the temperature of the antifriction bearing. The change speed of the temperature of the antifriction bearing in a normal operation or rotation has a behavior that it increases right after a change in the rotational speed, goes down immediately thereafter and becomes an approximately constant state. This behavior does not change even at different rotational speeds. Accordingly, by utilizing the change speed of the temperature as criterion for judgment of the abnormality, it is possible to reliably detect the abnormality or unusual operation of the antifriction bearing.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIGS. 2(a) and 2(b) are graphs each showing the temperature of an antifriction bearing and the change speed of the temperature relative to lapse time in the first embodiment for explaining an abnormality which is caused by the oversupply of lubrication oil to the antifriction bearing, wherein FIG. 2(a) is to show a normal operation while FIG. 2(b) is to show an abnormal operation and wherein the solid line, the one-dot-chain line and the two-dot-chain line respectively represent the temperature, the change speed of the temperature and a first threshold value Th1;

FIGS. 3(a) and 3(b) are graphs each showing the temperature of the antifriction bearing and the change speed of the temperature relative to lapse time in the first embodiment for explaining another abnormality which is caused by an excessive preload being imposed on the antifriction bearing, wherein FIG. 3(a) is to show a normal operation while FIG. 3(b) is to show an abnormal operation and wherein the solid line, the one-dot-chain line and the broken line respectively represent the temperature, the change speed of the temperature and a second threshold value Th2;

FIGS. 5(a) and 5(b) are graphs each showing the temperature of the antifriction bearing and the change speed of the temperature relative to lapse time in the second embodiment for explaining the abnormality which is caused by the excessive preload being imposed on the antifriction bearing, wherein FIG. 5(a) is to show a normal operation while FIG.

Figure 1:
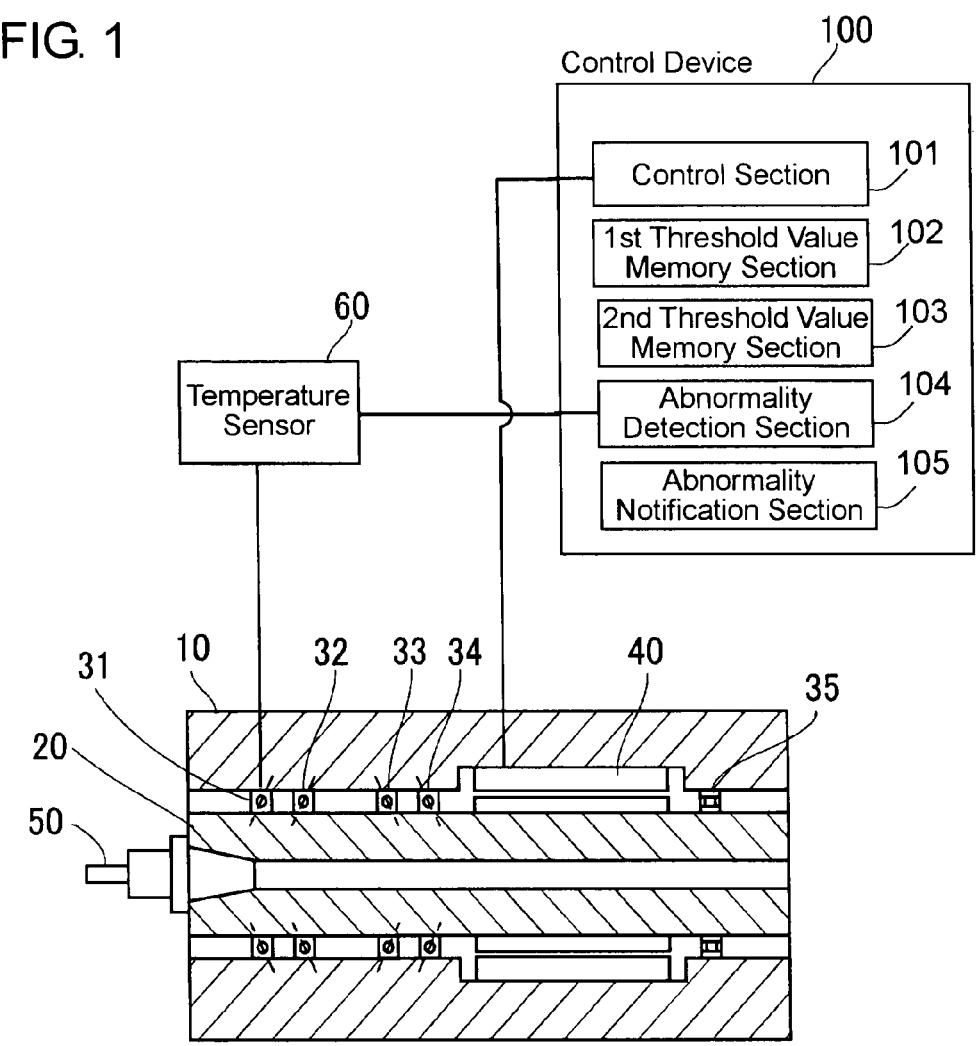
FIG. 1 is a schematic view showing the construction of a spindle device in a first embodiment according to the present invention.

5(b) is to show an abnormal operation and wherein the solid line, the one-dot-chain line and the two-dot-chain line respectively represent the temperature, the change speed of the temperature and a third threshold value Th3.

DETAILED DESCRIPTION OF THE PREFERRED EMBODIMENTS

Hereafter, spindle devices in embodiments according to the present invention will be described with reference to the accompanying drawings.
(First Embodiment)
Referring now to FIG. 1, a spindle device in the first embodiment is provided with a housing 10, a spindle 20, a plurality of antifriction bearings 31-35, an electric motor 40, a temperature sensor 60, and a control device 100. The housing 10 takes a generally cylindrical shape having a through bore (not numbered) of a circle in cross-section at its center. The spindle 20 takes a generally cylindrical shape and passes through the through bore of the housing 10. A tool 50 is detachably fitted in one end of the spindle 20.

The antifriction bearings 31-34 are single-row angular contact ball bearings, and the antifriction bearings 31, 32 are arranged on the side of one end of the spindle 20 in which end the tool 50 is fitted, with a predetermined space provided therebetween. The antifriction bearings 31, 32 are assembled with contact angles thereof directed in the same direction. The antifriction bearings 33, 34 are arranged at respective positions which are closer to the other end side of the spindle 20 than the antifriction bearing 32, with a predetermined space provided therebetween. The antifriction bearings 33, 34 are assembled with contact angles thereof directed in a direction opposite to the direction in which the contact angles of the antifriction bearings 31, 32 are directed. A preload is applied to the antifriction bearings 31-34 and acts to increase the rigidity of the support by the antifriction bearings 31-34. Further, the antifriction bearing 35 is a cylindrical roller bearing and is arranged at a position on the other end side of the spindle 20 which position is spaced another predetermined distance from the antifriction bearing 34. In this way, the spindle 20 is supported by the antifriction bearings 31-35 to be rotatable relative to the housing 10.

The motor 40 is arranged between the antifriction bearing 34 and the antifriction bearing 35 in the axial direction. A stator (not numbered) of the motor 40 is secured to an internal surface of the housing 10, while a rotor (not numbered) of the motor 40 is secured to a circumferential surface of the spindle 20.

The temperature sensor 60 is a sensor which detects the temperature of an outer race of the antifriction bearing 31 arranged on a position adjacent to the one end of the spindle 20, or the temperature of a part of either one of the housing 10 and the spindle 20 which part is influenced by the temperature change of the antifriction bearing 31. In this particular embodiment, as the temperature sensor 60, there is employed a well-known sensor described in, for example, JP2008-064183 A, and the temperature sensor 60 is used as a sensor for detecting the outer race of the antifriction bearing 31.

The control device 100 is composed of a control section 101, a first threshold value memory section 102, a second threshold value memory section 103, an abnormality detection section 104, and an abnormality notification section 105.

The control section 101 controls the rotational speed of the spindle 20 (which means the number of rotations per minute and which is also simply called "rotational number" in the art concerned) based on a rotational speed command read out from NC (Numerical Control) data. Specifically, the control section 101 serves to control the rotational speed of the spindle 20 by controlling the motor 40. In this particular embodiment, the spindle 20 is that provided in a machining center, wherein certain machining steps are carried out with the spindle 20 rotating at different rotational speeds each fixed to be constant. That is, rotational speed commands in the NC data constitute command values instructing rotational speeds at respective machining steps.

Further, the control section 101 performs the rotational speed control of the spindle 20 based on a judgment result of the abnormality detection section 104 referred to later. Specifically, the control section 101 reduces the rotational speed of the spindle 20 or stops the rotation of the spindle 20 when the abnormality detection section 104 judges that an abnormality (i.e., an unusual state in operation) has occurred in the antifriction bearings 31-35.

The first threshold value memory section 102 stores a first threshold value Th1 which represents a barometer or indicator that lubrication oil is being oversupplied to the antifriction bearing 31. That is, the first threshold value Th1 is a threshold value for detecting the abnormality which is caused by oversupplying lubrication oil to the antifriction bearing 31. This threshold value Th1 is set as a fixed value.

The second threshold value memory section 103 stores a second threshold value Th2 which represents another barometer or indicator that an excessive preload is being imposed on the antifriction bearing 31. That is, the second threshold value Th2 is a threshold value for detecting the abnormality of the antifriction bearing 31 which is caused by applying an excessive preload to the antifriction bearing 31. This second threshold value Th2 is set as a threshold value which changes to become smaller with lapse of time after each change in the rotational speed of the spindle 20.

The abnormality detection section 104 inputs thereto the temperature of the antifriction bearing 31 which is detected by the temperature sensor 60. Then, the abnormality detection section 104 calculates the change speed of the temperature of the antifriction bearing 31, that is, a first time-derivative value or first time-differential value of the temperature of the antifriction bearing 31. Then, the abnormality detection section 104 detects abnormalities of the antifriction bearing 31, that is, a heat generation abnormality caused by the oversupply of lubrication oil to the antifriction bearing 31 and a heat generation abnormality caused by the excessive preload being applied to the antifriction bearing 31, based on the calculated change speed of the temperature. Then, if judging that the antifriction bearing 31 is abnormal or unusual in operation, the abnormality detection section 104 outputs a signal to the control section 101 to reduce the rotational speed of the spindle 20 or to stop the rotation of the spindle 20. The details of how to detect the abnormalities will be referred to later.

The abnormality notification section 105 notifies the worker by alarming or turning on or flashing an alarm lamp when the abnormality detection section 104 judges that the antifriction bearing 31 is abnormal.

Figure 2A:
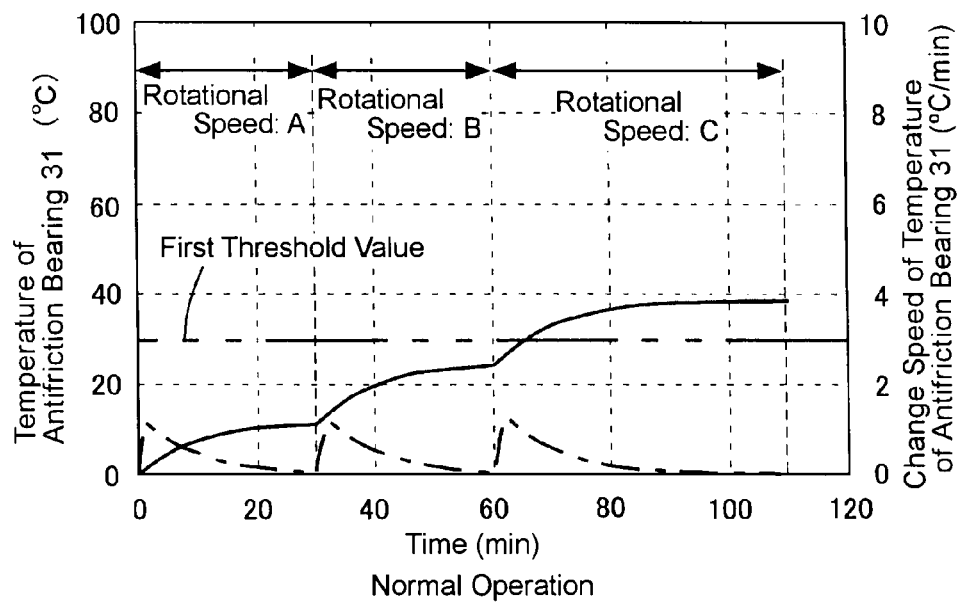
Figure 2B:
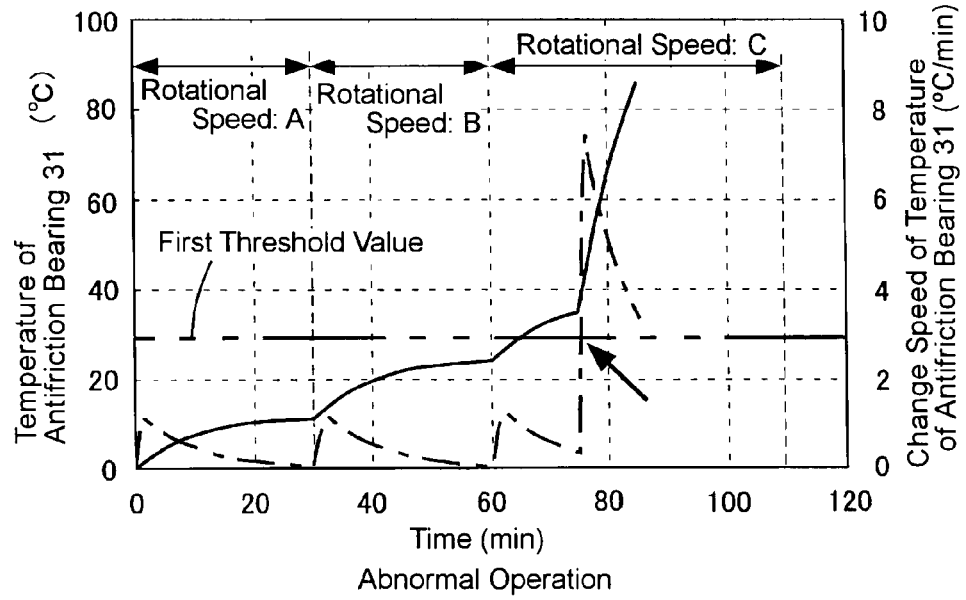

Next, detailed description will be made regarding the detection by the abnormality detection section 104 of the heat generation abnormality which is caused by the oversupply of lubrication oil to the antifriction bearing 31. FIGS. 2(a) and 2(b) represent the behavior of the temperature (shown by the solid line in the figures) of the antifriction bearing 31 and the change speed (shown by the one-dot-chain line in the figures) of the temperature in the case that the rotational speed of the spindle 20 is changed as follows. Further, in FIGS. 2(a) and 2(b), the two-dot-chain line represents the first threshold value Th1. That is, the rotational speed of the spindle 20 is changed from the stop state to the state of a rotational speed A. Then, after the spindle 20 is maintained at the rational speed A for a period of 30 minutes, the rotational speed of the spindle 20 is changed to a higher rotational speed B than the rotational speed A. Then, after the spindle 20 is maintained at the rational speed B for a period of 30 minutes, the rotational speed of the spindle 20 is changed to a higher rotational speed C than the rotational speed B and is maintained at the rotational speed C for a period of 50 minutes.

As shown by the solid line in FIG. 2(a), in the normal operation, after the change to the rotational speed A, the temperature of the antifriction bearing 31 rises gradually and comes into a saturated state after about 20 minutes to become a fixed value of about 10° C. In this case, as shown by the one-dot-chain line in FIG. 2(a), the change speed of the temperature of the antifriction bearing 31 increases sharply to around 1.5 [° C./min] right after the change to the rotational speed A and then reduces gradually to come close to zero.

Next, when the rotational speed is changed from A to B, the temperature of the antifriction bearing 31 further rises from the saturated temperature in the state of the rotational speed A and becomes a stable state at about 25° C. after a period of about 20 minutes following the change. In this case, the change speed of the antifriction bearing 31 increases sharply to around 1.5 [° C./min] right after the change to the rotational speed B and then reduces gradually to come close to zero.

Subsequently, when the rotational speed is changed from B to C, the temperature of the antifriction bearing 31 further rises from the saturated temperature in the state of the rotational speed B and becomes a stable state at about 38° C. after a period of about 20 minutes following the change. In this case, the change speed of the antifriction bearing 31 increases sharply to around 1.5 [° C./min] right after the change to the rotational speed C and then reduces gradually to come close to zero.

In this embodiment, the first threshold value Th1 stored in the first threshold value memory section 102 is set to a fixed value of 3.0 [° C./min]. The abnormality detection section 104 judges whether or not the calculated change speed of the temperature of the antifriction bearing 31 exceeds the first threshold value Th1 and, if the calculated value exceeds the first threshold value Th1, judges that the heat generation abnormality caused by the oversupply of lubrication oil to the antifriction bearing 31 has occurred. More specifically, in the case of a normal operation, as shown in FIG. 2(a), since the change speed of the temperature of the antifriction bearing 31 does not exceed the first threshold value Th1, the abnormality detection section 104 does not judge that the heat generation abnormality caused by the oversupply of lubrication oil to the antifriction bearing 31 has occurred.

FIG. 2(b) represents the case of an abnormal operation. In this exemplified case, it is supposed that the rotational speed of the spindle 20 is changed from B to C, and that the heat generation abnormality caused by the oversupply of lubrication oil to the antifriction bearing 31 has occurred right after the change (i.e., at a lapse time of around 75 minutes in the figure). As the supply quantity of lubrication oil to the antifriction bearing 31 becomes excessive, an agitation action is induced in the lubrication oil, so that the temperature of the antifriction bearing 31 rises sharply.

As shown in FIG. 2(b), following the change from B to C of the rotational speed of the spindle 20, the temperature of the antifriction bearing 31 rises sharply to 80° C. or higher contrary to going to a saturated state. At this time, the change speed of the temperature of the antifriction bearing 31 sharply increases to 7 [° C./min] at the moment that the temperature of the antifriction bearing 31 begins to heat up extraordinarily.

The first threshold value Th1 has been set to 3.0 [° C./min], and thus, when the extraordinary heating takes place due to the oversupply of lubrication oil to the antifriction bearing 31, the change speed of the temperature of the antifriction bearing 31 exceeds the first threshold value Th1. Specifically, the change speed exceeds the first threshold value Th1 at around a lapse time of 75 minutes. Therefore, at this moment, the abnormality detection section 104 judges that the heat generation abnormality has occurred due the oversupply of lubrication oil to the antifriction bearing 31. Then, the control section 101 executes a processing to reduce the rotational speed of the spindle 20 or to stop the rotation. At the same time, the abnormality notification section 105 issues an abnormality notification.

In this particular instance, at the time that the change speed of the temperature of the antifriction bearing 31 exceeds 3.0 [° C./min] being the first threshold value Th1, the temperature of the antifriction bearing 31 still remains at 40° C. or so. The temperature 40° C. of the antifriction bearing 31 is in the level of being slightly higher than the saturated temperature 38° C. which the spindle 20 is to reach in the state of the rotational speed C. Accordingly, at this time point, the antifriction bearing 31 is still in the state that it has not fallen into seizure. In this way, by making a judgment based on the change speed of the temperature of the antifriction bearing 31, it can be realized to reliably detect the heat generation abnormality of the antifriction bearing 31 which is caused by the oversupply of lubrication oil to the antifriction bearing 31.

Figure 3A:
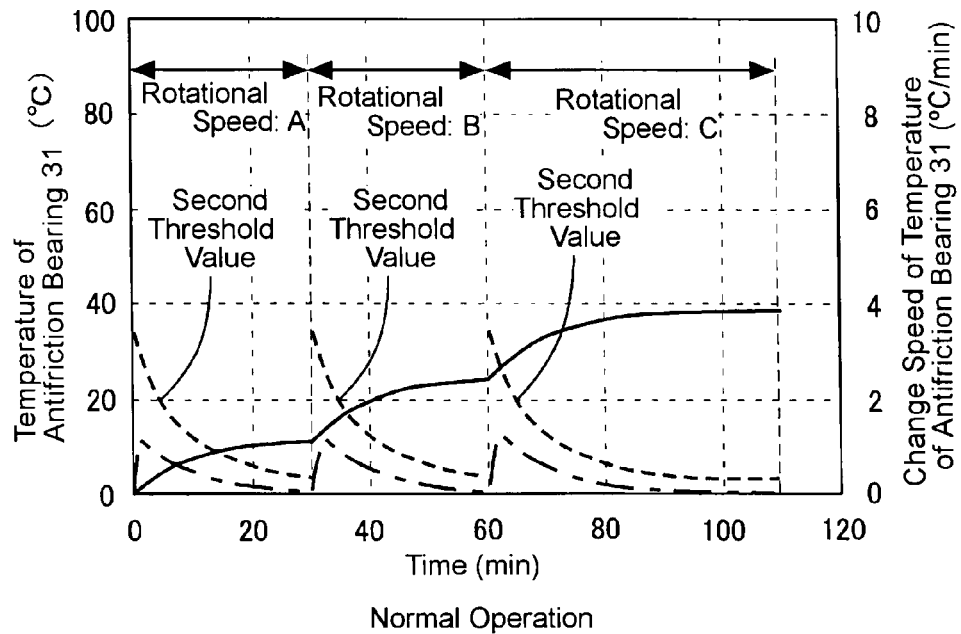
Figure 3B:
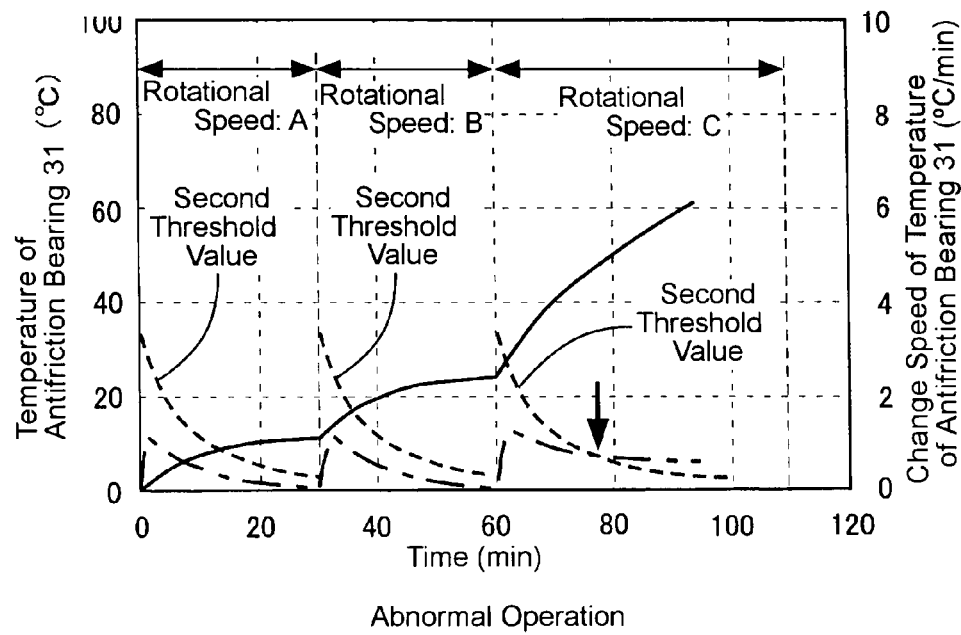

Next, with reference to FIGS. 3(a) and 3(b), description will be made regarding the detection by the abnormality detection section 104 of a heat generation abnormality which is caused by an excessive preload being applied to the antifriction bearing 31. FIGS. 3(a) and 3(b) represent the behavior of the temperature (shown by the solid line in the figures) of the antifriction bearing 31 and the change speed (shown by the one-dot-chain line in the figures) of the temperature in the case that the rotational speed of the spindle 20 is changed in the manner as aforementioned in the case of FIGS. 2(a) and 2(b). Further, in FIGS. 3(a) and 3(b), the broken line represents the second threshold value Th2.

First, the second threshold value Th2 will be described. As mentioned earlier, the second threshold value Th2 is set as a threshold value which changes to become smaller with lapse of time after each change in the rotational speed of the spindle 20. The second threshold value Th2 is represented by the following mathematical expression 1. In the expression 1, "[change speed of temperature]" means the change speed of the temperature of the antifriction bearing 31.

[Expression 1]

$$Th2 = [\text{change speed of temperature}] \times A \times e^{-\beta t} + B \qquad (1)$$

A, B and β: constants
t: lapse time from the time when the rotational speed of the spindle 20 is changed.

That is, as shown in FIGS. 3(a) and 3(b), each time the rotational speed of the spindle 20 is changed, the second threshold value Th2 is set to a predetermined value such as, for example, about 3.5 [° C./min] and goes on to decrease gradually thereafter.

Further, in the case of the normal operation, the behavior of the change speed of the temperature of the antifriction bearing 31 is as mentioned earlier. In the case of the normal operation, it does not occur that the change speed of the temperature of the antifriction bearing 31 exceeds the second threshold value Th2. Accordingly, the abnormality detection section 104 does not judge that a heat generation abnormality caused by an excessive preload being imposed on the antifriction bearing 31 has occurred.

In the case of the abnormal operation, as shown in FIG. 3(b), a heat generation abnormality caused by an excessive preload being imposed on the antifriction bearing 31 is supposed to have occurred at around the time point (at around a lapse time of 60 minutes in the figure) when the rotational speed of the spindle 20 is changed from B to C.

As shown in FIG. 3(b), just from the time that the rotational speed of the spindle 20 is changed from B to C, the rising speed of the temperature of the antifriction bearing 31 becomes higher in comparison with that in the case of the normal operation, and the temperature further rises beyond the temperature in the saturated state in the case of the normal operation. That is, the temperature of the antifriction bearing 31 goes on to rise without becoming the saturated state. In this case, the change speed of the temperature of the antifriction bearing 31 increases sharply right after the rotational speed of the spindle 20 is changed from B to C and then, reduces gradually, but it remains at a higher value in comparison with that in the case of the normal operation.

The change speed of the temperature of the antifriction bearing 31 which exhibits the behavior like this crosses the second threshold value Th2 at around a lapse time of 75 minutes (i.e., at the position indicated by the arrow in the figure). That is, the change speed of the temperature of the antifriction bearing 31 exceeds the second threshold value Th2. At this moment, the abnormality detection section 104 detects that the antifriction bearing 31 has fallen into the heat generation abnormality due to the excessive preload being imposed on the antifriction bearing 31. In this way, by setting the second threshold value Th2 as mentioned earlier and by making a judgment based on the change speed of the temperature of the antifriction bearing 31, it can be realized to detect the heat generation abnormality of the antifriction bearing 31 caused by the excessive preload reliably and at an early stage.

Second Embodiment

A spindle device in a second embodiment will be described with reference to FIGS. 4, 5(a) and 5(b). The spindle device in the second embodiment differs from the spindle device in the first embodiment only in a control device 200. Other constructions are common to those in the first embodiment, and the detailed description thereof will be omitted for the sake of brevity.

Figure 4:
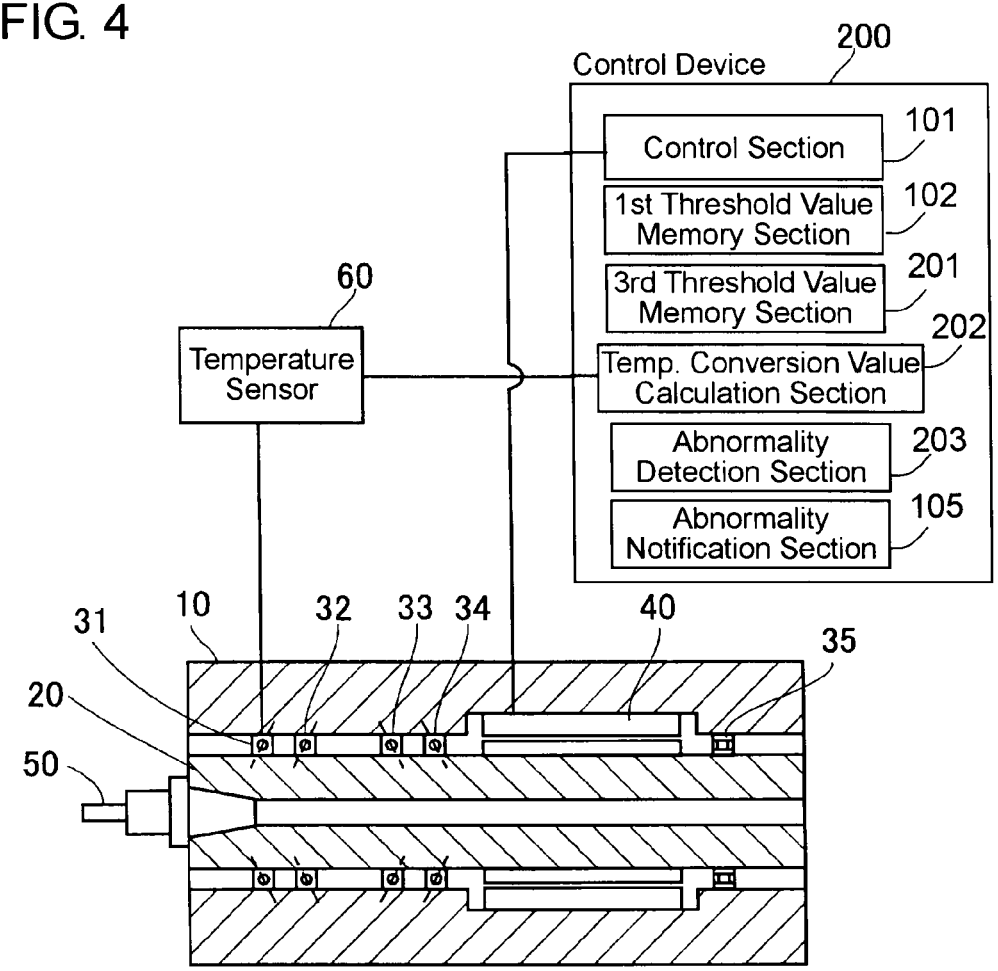
FIG. 4 is a schematic view showing the construction of a spindle device in a second embodiment according to the present invention.

As shown in FIG. 4, the control device 200 is composed of a control section 101, a first threshold value memory section 102, a third threshold value memory section 201, a temperature conversion value calculation section 202, an abnormality detection section 203, and an abnormality notification section 105. The control section 101 and the abnormality notification section 105 are substantially the same as those in the first embodiment, and the detailed description thereof will be omitted for the sake of brevity.

The third threshold value memory section 201 stores therein a third threshold value Th3 representing a barometer or indicator that the antifriction bearing 31 is under an excessive preload. That is, the third threshold value Th3 is a threshold value for detecting the abnormality of the antifriction bearing 31 caused by the excessive preload being imposed on the antifriction bearing 31. This threshold value Th3 has been set as a fixed value.

The temperature conversion value calculation section 202 inputs thereto the temperature of the antifriction bearing 31 detected by the temperature sensor 60. Then, the temperature conversion value calculation section 202 calculates a temperature conversion value X by using the following mathematical expression 2. In the expression 2, "[change speed of temperature]" means the change speed of the temperature of the antifriction bearing 31.

[Expression 2]

$$X = [\text{change speed of temperature}] \times C \times e^{\gamma t} \quad (2)$$

X: temperature conversion value [° C.]
C and γ: constants
t: lapse time from the time when the rotational speed of the spindle 20 is changed.

Figure 5A:
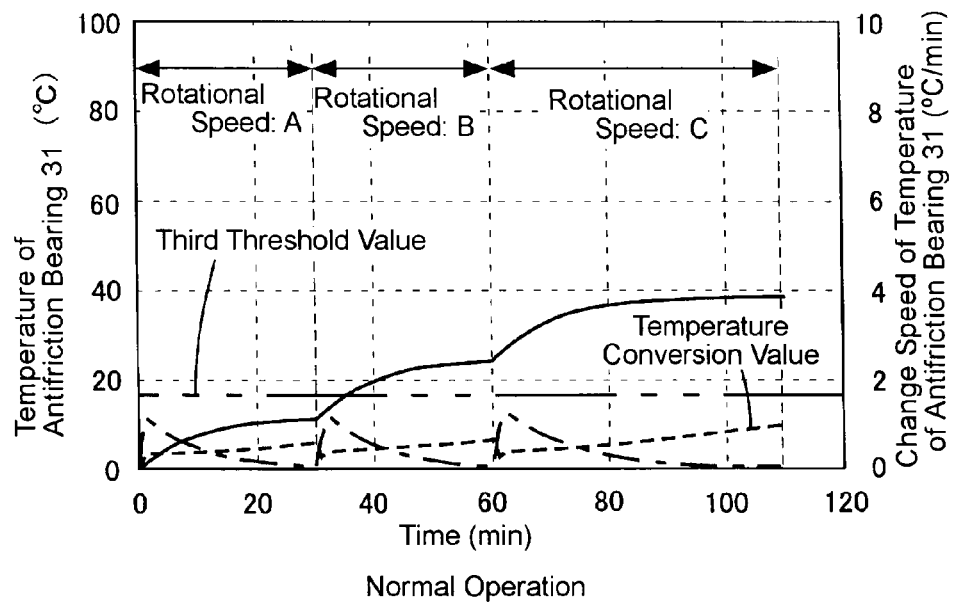
Figure 5B:
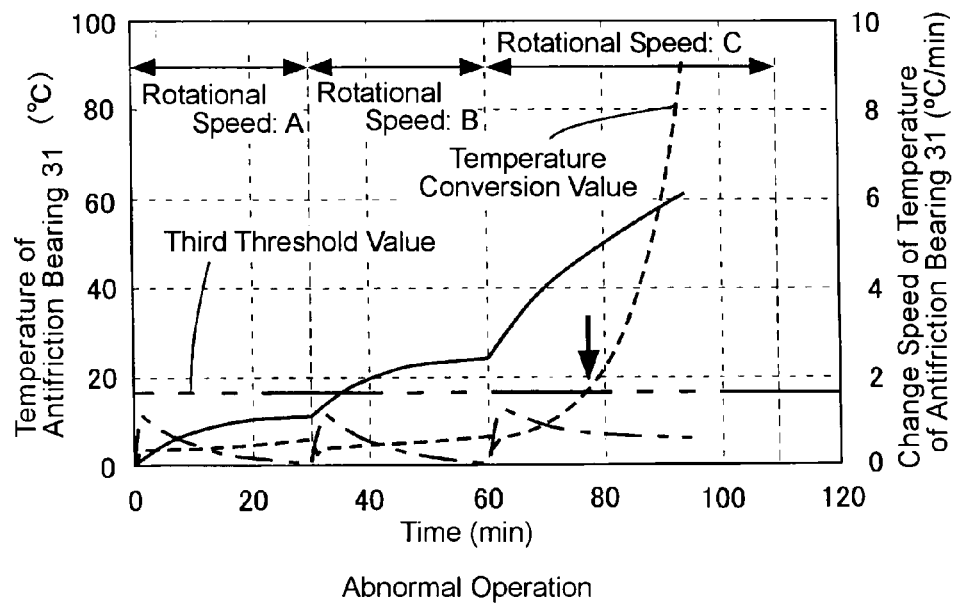

That is, as shown in FIGS. 5(a) and 5(b), the temperature conversion value X becomes larger in proportion to the change speed of the temperature of the antifriction bearing 31 and also becomes larger with lapse of time after the rotational speed of the spindle 20 is changed. The temperature conversion value X is set to a predetermined value such as, for example, about 5° C. each time the rotational speed of the spindle 20 is changed. It is to be noted that the predetermined value can arbitrarily varied in dependence of the settings of the constants.

In the case of the normal operation, as shown in FIG. 5(a), the temperature conversion value X increases with a very slight gradient while the spindle 20 is at the rotational speed A. Then, right after the rotational speed of the spindle 20 is changed from A to B, the temperature conversion value X decreases temporarily and then, increases with a very slight gradient. The same behavior is exhibited even after the rotational speed of the spindle 20 is changed to C.

In the case of the normal operation, since the behavior exhibited is that the change speed of the temperature of the antifriction bearing 31 is the largest right after the change in the rotational speed of the spindle 20 and comes close to zero thereafter, the temperature conversion value X exhibits the aforementioned behavior. Therefore, the maximum value of the temperature conversion value X becomes 10° C. or so. It is to be noted that the maximum value can arbitrarily vary in dependence of the settings of the constants.

The abnormality detection section 203 judges whether or not the temperature conversion value X calculated by the temperature conversion value calculation section 202 has exceeded the third threshold value Th3. Then, if judging that the temperature conversion value X has exceeded the third threshold value Th3, the abnormality detection section 203 judges that the heat generation abnormality due to the excessive preload has occurred in the antifriction bearing 31. Thereafter, the abnormality detection section 203 outputs a signal indicating the abnormality to the control section 101 as well as to the abnormality notification section 105.

Since the third threshold value Th3 has been set to 15° C. as shown in FIGS. 5(a) and 5(b), it does not occur that the temperature conversion value X exceeds the third threshold value Th3 in the case of the normal operation. Therefore, the abnormality detection section 203 does not judge that the heat generation abnormality due to the excessive preload has occurred in the antifriction bearing 31. In this case, the control section 101 continues to the control which it has executed until then, and the abnormality notification section 105 does not execute any processing.

In the case of the abnormal operation, on the contrary, it is supposed that as shown in FIG. 5(b), the heat generation abnormality of the antifriction bearing 31 due to the excessive preload has occurred at the time point (at around a lapse time of 60 minutes in the figure) when the rotational speed of the spindle 20 is changed from B to C.

As shown in FIG. 5(b), just from the time that the rotational speed of the spindle 20 is changed from B to C, the rising speed of the temperature of the antifriction bearing 31 becomes higher in comparison with that in the case of the normal operation, and the temperature further rises beyond the temperature in the saturated state in the case of the normal operation. That is, the temperature of the antifriction bearing 31 goes on to rise without becoming the saturated state. In this case, the change speed of the temperature of the antifriction bearing 31 increases right after the rotational speed of the spindle 20 is changed from B to C and then, reduces gradually, but it remains at a higher value in comparison with that in the case of the normal operation.

As a result, the temperature conversion value X becomes a very larger value with the lapse of time in comparison with that in the case of the normal operation. Therefore, it results that the temperature conversion value X exceeds the third threshold value Th3 at around a lapse time of 75 minutes. At this moment, the abnormality detection section 203 detects that the antifriction bearing 31 has fallen into the heat generation abnormality caused by the excessive preload. In this way, by calculating the temperature conversion value X by the use of the aforementioned expression which is a function depending on the change speed of the temperature of the antifriction bearing 31, it can be realized to detect the heat generation abnormality of the antifriction bearing 31 caused by the excessive preload reliably and at an early stage.

(Other Embodiments or Modifications)

In the foregoing embodiments, the temperature of the antifriction bearing 31 is detected by the temperature sensor 60, and the abnormality of the antifriction bearing 31 is detected by using the temperature so detected. In a modified form, the same abnormality detection may be carried out with each or all of other antifriction bearings 32-35. Further, where the construction of the machine tool causes a particular one of the antifriction bearings 31-35 to be most liable to suffer the abnormality, the detection of the abnormality may be carried out with such a particular one antifriction bearing only.

The examples in the first and second embodiments have been shown for the heat generation abnormality of the antifriction bearing caused by the excessive preload. It is possible to use only one of these examples. Besides, where both of the examples are used, a judgment of the abnormality may be made when the abnormality is detected in either one of the examples.

Various features and many of the attendant advantages in the foregoing embodiments will be summarized as follows:

In the spindle device in the first embodiment shown in FIGS. 1, 2(a) and 2(b), since the abnormality of the antifriction bearing 31 is detected based not on the temperature itself of the antifriction bearing 31, but on the change speed (the one-dot-chain line in FIGS. 2(a) and 2(b)) of the temperature of the antifriction bearing 31, that is, the first time-derivative value of the temperature of the antifriction bearing 31. The change speed of the temperature of the antifriction bearing 31 in the normal operation or rotation exhibits a behavior that it increases right after the change in the rotational speed and goes down immediately thereafter to become an approximately constant state. This behavior is the same even at different rotational speeds (A, B and C in FIG. 2(a)). Accordingly, by utilizing the change speed of the temperature as criterion for judgment of the abnormality, it is possible to detect the abnormality or unusual operation of the antifriction bearing 31 reliably.

Also in the spindle device in the first embodiment shown in FIGS. 1, 2(a) and 2(b), it is possible to reliably detect the abnormality caused by the oversupply of lubrication oil to the antifriction bearing 31. In the case of the oversupply of lubrication oil, an action agitating lubrication oil may take place to cause the antifriction bearing 31 to rise sharply in temperature. Even in this case, it is possible to detect the abnormality reliably by utilizing the change speed of the temperature of the antifriction bearing 31 as criterion for judgment of the abnormality.

Also in the spindle device in the first embodiment shown in FIGS. 1, 2(a) and 2(b), the first threshold value Th1 is set to a fixed value which corresponds to the oversupply quantity of lubrication oil to the antifriction bearing 31. Thus, it can be realized to reliably detect the abnormality of the antifriction bearing 31 caused by the oversupply of lubrication oil.

Also in the spindle device in the first embodiment shown in FIGS. 1, 3(a) and 3(b), it is possible to reliably detect the abnormality of the antifriction bearing 31 caused by the excessive preload thereon. In the case of the normal operation, when the rotational speed of the spindle 20 is increased, the temperature of the antifriction bearing 31 is saturated to become an approximately constant temperature after the lapse of a predetermined period of time. In the case of the abnormal operation, on the contrary, when the rotational speed of the spindle 20 is increased, the temperature of the antifriction bearing 31 is not saturated even after the lapse of the predetermined period of time and further rises beyond the constant temperature. Even in the case of the abnormal operation, it becomes possible to detect the abnormality of the antifriction bearing 31 by utilizing the change speed of the temperature of the antifriction bearing 31 as criterion for judgment of the abnormality.

Also in the spindle device in the first embodiment shown in FIGS. 1, 3(a) and 3(b), since the judgment for abnormality is made by reference to the second threshold value Th2 representing an indicator that the preload applied to the antifriction bearing 31 is excessive, it is possible to precisely and reliably detect the abnormality of the antifriction bearing 31 caused by the excessive preload thereon.

Also in the spindle device in the first embodiment shown in FIGS. 1, 3(a) and 3(b), since the second threshold value Th2 is a threshold value which changes with lapse of time after each change in the rotational speed of the spindle 20, it is possible to detect the abnormality of the antifriction bearing 31 caused by the excessive preload thereon at an earlier stage.

In the spindle device in the second embodiment shown in FIGS. 4, 5(a) and 5(b), since the temperature conversion value calculation section 202 calculates the temperature conversion value X which becomes larger in proportion to the change speed of the temperature of the antifriction bearing 31 and which becomes larger with lapse of time after each change in the rotational speed of the spindle 20 and since the abnormality of the antifriction bearing 31 is detected in comparison of the temperature conversion value X with the third threshold value Th3 representing an indicator that the preload being applied to the antifriction bearing 31 is excessive, it is possible to detect the abnormality of the antifriction bearing 31 caused by the excessive preload thereon at an earlier stage and in a reliable manner.

Obviously, numerous further modifications and variations of the present invention are possible in light of the above teachings. It is therefore to be understood that within the scope of the appended claims, the present invention may be practiced otherwise than as specifically described herein.

What is claimed is:

1. A spindle device comprising:
a housing;
a spindle carried in the housing;

an antifriction bearing provided in the housing for rotatably supporting the spindle in the housing;

a temperature sensor for detecting the temperature of the antifriction bearing or the temperature of a part of either one of the housing and the spindle which part is influenced by a temperature change of the antifriction bearing; and an abnormality detection section for detecting the abnormality of the antifriction bearing based on a change speed of the temperature detected by the temperature sensor.

2. The spindle device as set forth in claim 1, wherein the abnormality detection section detects the abnormality of the antifriction bearing caused by oversupply of lubrication oil to the antifriction bearing.

3. The spindle device as set forth in claim 2, further comprising:

a first threshold value memory section for storing a first threshold value representing an indicator that an excess quantity of lubrication oil is supplied to the antifriction bearing;

wherein the abnormality detection section detects the abnormality of the antifriction bearing when the change speed of the temperature detected by the temperature sensor exceeds the first threshold value.

4. The spindle device as set forth in claim 1, wherein the abnormality detection section detects the abnormality of the antifriction bearing caused by an excessive preload being applied to the antifriction bearing.

5. The spindle device as set forth in claim 4, further comprising:

a second threshold value memory section for storing a second threshold value representing an indicator that a preload being applied to the antifriction bearing is excessive;

wherein the abnormality detection section detects the abnormality of the antifriction bearing when the change speed of the temperature detected by the temperature sensor exceeds the second threshold value.

6. The spindle device as set forth in claim 5, wherein the second threshold value is a threshold value which changes to become smaller with lapse of time after each change in the rotational speed of the spindle.

7. The spindle device as set forth in claim 4, further comprising:

a temperature conversion value calculation section for calculating a temperature conversion value which becomes larger in proportion to the change speed of the temperature detected by the temperature sensor and which becomes larger with lapse of time after each change in the rotational speed of the spindle; and a third threshold value memory section for storing a third threshold value representing an indicator that a preload being applied to the antifriction bearing is excessive;

wherein the abnormality detection section detects the abnormality of the antifriction bearing when the temperature conversion value exceeds the third threshold value.

* * * * *